(12) United States Patent
Kanungo et al.

(10) Patent No.: US 6,625,307 B1
(45) Date of Patent: Sep. 23, 2003

(54) IMAGE DECODE OPTIMIZATION TECHNIQUES

(75) Inventors: Rajesh Kanungo, Sunnyvale, CA (US); Venkatesh Narayanan, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 506 days.

(21) Appl. No.: 09/595,553

(22) Filed: Jun. 15, 2000

Related U.S. Application Data

(60) Provisional application No. 60/146,418, filed on Jul. 29, 1999.

(51) Int. Cl.[7] .................................................. G06K 9/00
(52) U.S. Cl. ....................................... 382/166; 382/233
(58) Field of Search ................................... 382/162, 166, 382/167, 233; 345/593, 603

(56) References Cited

U.S. PATENT DOCUMENTS 5,710,577 A * 1/1998 Laumeyer .................... 345/548
6,141,441 A * 10/2000 Cass et al. .................... 382/166
6,259,810 B1 * 7/2001 Gill et al. ..................... 382/166

* cited by examiner

*Primary Examiner*—Phuoc Tran
(74) *Attorney, Agent, or Firm*—Beyer Weaver & Thomas LLP

(57) ABSTRACT

In general, a method and apparatus for decoding an encoded digital image is disclosed. An image decoder receives an encoded digital image and determines if the image can be directly decoded and displayed on a display monitor. By directly decoding the encoded digital image, the image decoder eliminates unnecessary intermediate decoding processes.

14 Claims, 7 Drawing Sheets

IMAGE DECODE OPTIMIZATION TECHNIQUES

This application claims the benefit of Provisional application Ser. No. 60/146,418, filed Jul. 29, 1999.

BACKGROUND OF THE INVENTION

1. Field of Invention

The invention relates generally to computer systems. More particularly, methods and apparatus for decoding images in a browser environment are disclosed.

2. Description of Relevant Art

The explosive growth in Internet traffic has made it critical to look for ways of accommodating the increasing number of users while preventing excessive delays, congestion and widespread blackouts. For the past several years a large proportion of Internet traffic has been generated by web-browsing and most of the web browsing traffic is in turn comprised of digital images. This trend will continue with more sites becoming media rich as the users' access bandwidths increase and media-enabled PCs become more common.

This great increase in the number and size of digital images being transmitted over the Internet and subsequently stored in both personal as well as host computers has led to a great deal of effort being devoted to studying image coding and decoding techniques. Such techniques are useful in both preserving memory resources but also improves system performance by reducing the amount of data required to be processed and transmitted over various networks.

Several conventional techniques are used to both encode and subsequently decode digital images that will ultimately be output to a computer display. In computer display technology, a color is set for each individual pixel or addressable illumination element on the screen. Each pixel has a red, a green, and a blue (RGB) component. By specifying the amount of intensity for each of these components, a distinct color is given to that pixel. Therefore, each pixel has associated with it a specific number of bits corresponding to the number of red, green, and blue color components used to derive what is referred to as a color-palette, or number of available colors. By way of example, for Web presentations, available color pallets are limited to the 256 colors represented by an 8-bit variation for each pixel that most computer monitors can display. Occasionally, users with very high-quality display monitors and adapters that provides a 24-bit variation for each pixel can view up to 16,777,216 different colors. However, since most computers can only handle an 8-bit variation, limiting the display to a 256 color-palette, digital images with 24-bit color resolution have substantially more color information than can possibly be displayed and as such, are wasteful of both memory and system resources.

Unfortunately, in order to accommodate the most general situations, conventional embedded image encoding and decoding systems use a 24 bit conversion methodology regardless of the ultimate display capability of the end user. By way of example, if, as shown in FIG. 1 illustrating a conventional image decoding system 100, an image producer 102 provides an 8-bit image 104 to an image filter 106 coupled to an image consumer, such as a display monitor 108. Typically, the image filter 106 filters the image 104 on a pixel by pixel basis to produce a 24 bit representation of the image regardless of the capability of the display monitor 106. By rendering a 24 bit image representation, the image decoder 100 is capable of handling even those situations where a 24-bit display monitor is available. However, this capability comes at the cost of slow performance and wasted resources for the most other applications for which a 24 bit display monitor is not used.

Therefore, what is desired is an efficient method and apparatus for intelligently decoding a compressed digital image based, in part, upon the display capability of the end user.

SUMMARY OF THE INVENTION

Broadly speaking, the invention relates to an improved method, apparatus and computer system for efficiently decoding a compressed digital image. The invention can be implemented in numerous ways, including as a method, a computer system, and an apparatus. Several embodiments of the invention are discussed below.

According to one aspect of the present invention, in an object based computer system, a computer implemented method for displaying a digital image on a display monitor coupled to the computer system is disclosed. After the format and output color model of a received digital image are determined, then the digital image is directly decoded using the output color model. The decoded image is then sent to the monitor for viewing.

In one embodiment of the invention, image is included in a web page requested by a web browser resident on the computer system.

In another embodiment of the invention, the image decoder is included in a browser that is resident in a set top box coupled to a television system having a display monitor. The set top box is arranged to receive documents from a host computer that includes a digital image. The image decoder receives the digital image, and based upon the display characteristics of the display monitor, decodes the digital image. In a preferred embodiment, the image decoder directly decodes the digital image which is then sent directly to the display monitor with no intermediate image decoding.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In the following description, frameworks and methods of decoding images in embedded systems, such as for example, a browser environment are described. Although, the invention will initially be described in terms of a browser application residing in a PC environment, it should be noted that the present invention can be used in any system that decodes encoded digital images.

In general, when a browser having a local cache memory receives a document request in the form of a document URL (universal resource locator), a determination is made whether or not a retrieved document includes a compressed digital image. If the document includes a digital image, then a determination of the image format is made. Once the image format has been determined, then a determination is made whether or not the image can be decoded directly to an image suitable for display on a display monitor. If appropriate, the image is the directly decoded and displayed on the display monitor. In this way, the performance of the browser is substantially improved since any unnecessary intermediate image processing is substantially eliminated.

Figure 1:
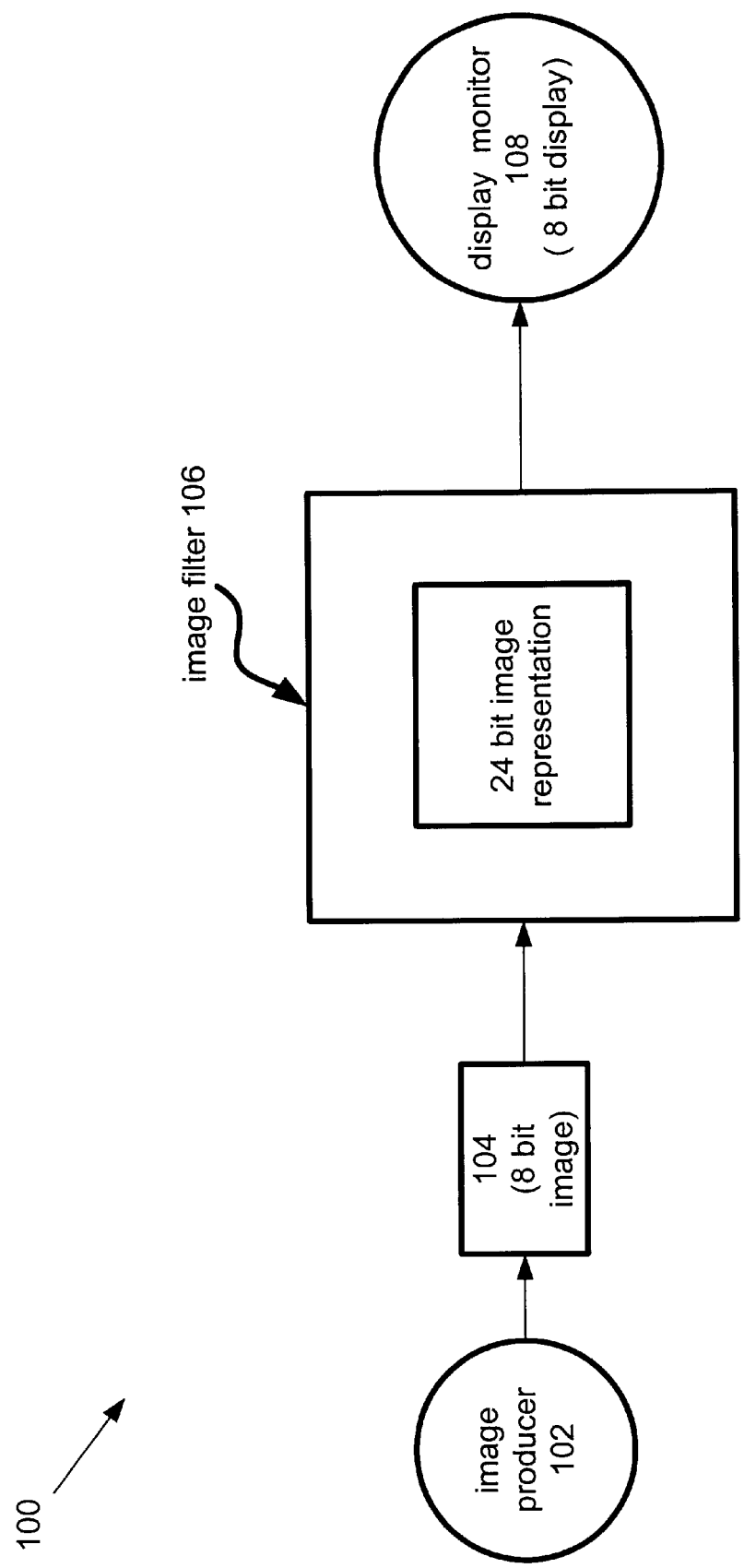
FIG. 1 shows a conventional embedded image decoder system.
Figure 2:
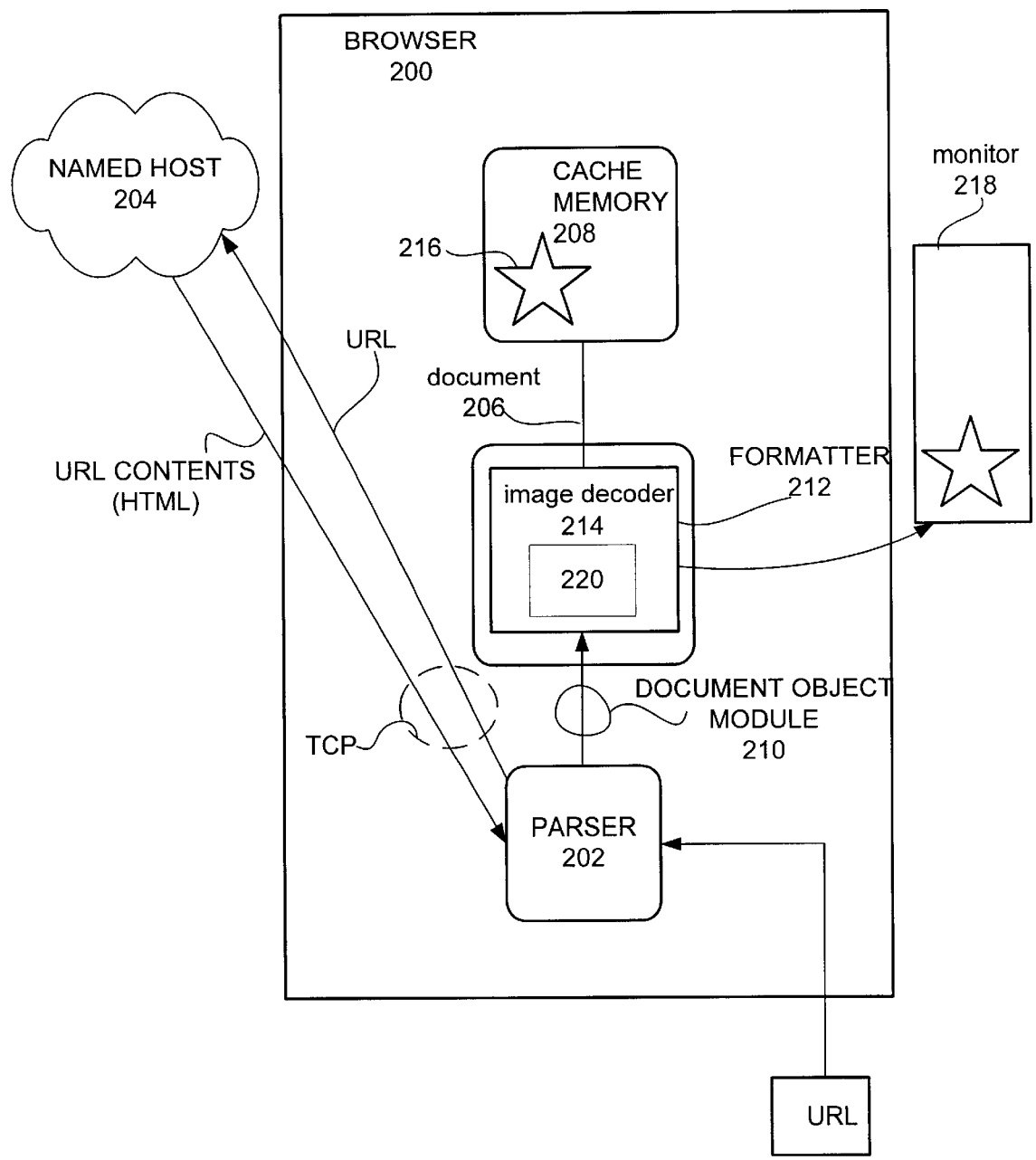
FIG. 2 shows a web browser incorporating an image decoder system in accordance with an embodiment of the invention.

Most web browsers have a very simple approach to networking as illustrated in FIG. 2. Given a browser 200 and a URL (universal resource locator) containing a host name and a document on that host, a parser 202 included in the browser 200 breaks up (parses) the URL into a named host portion 204 and a requested document portion 206. In one embodiment of the invention, the requested document 206 takes the form of HTML (Hyper Text Markup Language) statements well known to those skilled in the art.

In the case where the requested document is not stored in a local cache memory 208, the parser 202 makes a TCP ("transmission control protocol") connection to the named host portion 204 and retrieves the contents that include the document portion 206 of the requested URL. In one embodiment, the URL contents retrieved from the named host portion 204 includes those HTML statements corresponding to the requested document portion 206. The parser 202 uses the HTML statements corresponding to the requested document portion 206 to form what is referred to as an instance of the document object model (DOM) 210 that is passed to a formatter 212 that includes an image decoder (encoder/decoder) 214. In the described embodiment, the image decoder 214 decodes (i.e., decompresses) an encoded digital image 216 included in the retrieved document 206 based, in part, upon the display characteristics of a display monitor 218 coupled to the browser 200. In those situations where the encoded digital image 216 can be directly decoded to a digital image suitable for viewing on the display monitor 218, the image decoder 214 directly decodes the encoded digital image 216 using a resident color model 220. In the described embodiment, it is the color model 220 that describes both the pixel layout as well as the interpretation of the color data within the encoded digital image 216. In the described embodiment, the color model 220 includes a pre-computed color table 222 used to directly decode the encoded image 216 for viewing on the display monitor 218. In the described embodiment, this color table is computed after starting to decode the image, just prior to computer each pixel's color value. This is done only for a "color index" image, such as a GIF image. This is particularly useful for displaying an image on an 8-bit monitor.

Figure 3:
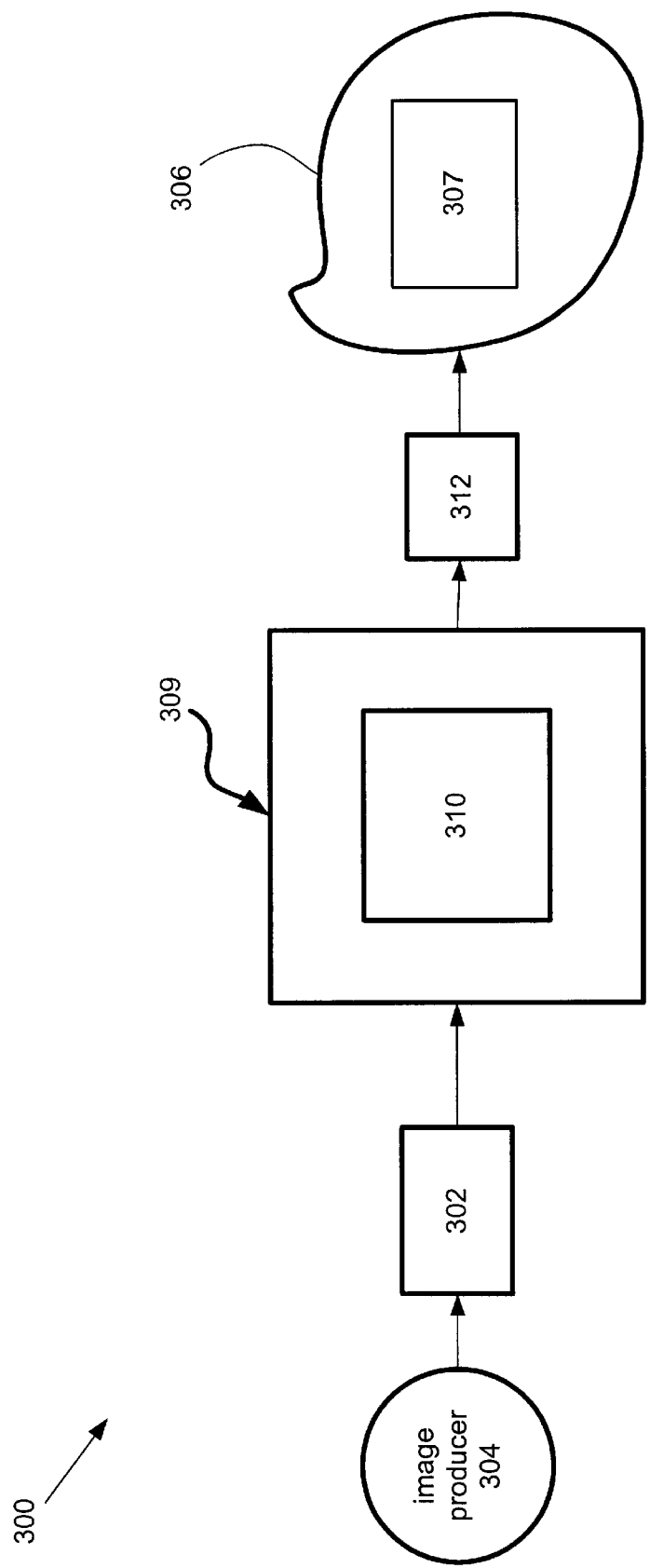
FIG. 3 illustrates an image encoder/decoder in accordance with an embodiment of the invention.

A particular example of the image decoder 214 representative of a push model image decoder 300 is shown in FIG. 3. In the described embodiment, the image decoder 300 uses a simple image processing chain that includes image producers and image consumers for image processing. As shown, an image object 302 is an abstraction that is not manipulated directly, rather it is used to obtain a reference to another object that implements an image producer 304. Objects that implement this interface are in turn attached to objects that implement an image consumer 306 such as for example, a display monitor 307. An image filter 308, that includes a precomputed color table 310, can serve as both a source and sink of image data.

To process images in the push model, the image object 302 is obtained from some source such as, for example, an applet typical of Java based browsers. An image source method can then be used to get the image producer 304 for that image object 302. A series of filtered image source objects 309 can then be attached to the image producer 304, with each filter 309 being an image consumer of the previous image source. Typically, a few simple filters are defined for implementing, for example, image cropping and color channel manipulation. If the image object 302 can be directly decoded to a consumer image 312, the precomputed color table 310 is used to directly decode the image 302 for viewing on the display 307.

Digital images, specifically digital color images, come in several different forms. The form is often dictated by the means by which the image was acquired or by the image's intended use. One of the more basic types of color image is RGB, for the three primary colors (red, green, and blue). RGB images are sometimes acquired by a color scanner or video camera. These devices incorporate three sensors that are spectrally sensitive to light in the red, green, and blue portions of the spectrum. The three separate red, green, and blue values can be made to directly drive red, green, and blue light guns in a CRT. This type of color system is called an additive linear RGB color system, as the sum of the three full color values produces white.

Printed color images are based on a subtractive color process in which cyan, magenta, and yellow (CMY) dyes are deposited onto paper. The amount of dye deposited is subtractively proportional to the amount of each red, blue, and green color value. The sum of the three CMY color values produce black. The black produced by a CMY color system often falls short of being a true black. To produce a more accurate black in printed images, black is often added as a fourth color component. This is known as the CMYK color system and is commonly used in the printing industry.

Since, the amount of light generated by the red, blue, and green phosphors of a CRT is not linear, in order to achieve good display quality, the red, blue, and green values must be adjusted—a process known as gamma correction. In computer systems, gamma correction often takes place in the frame buffer, where the RGB values are passed through lookup tables that are set with the necessary compensation values.

In television transmission systems, the red, blue, and green gamma-corrected color video signals are not transmitted directly. Instead, a linear transformation between the RGB components is performed to produce a luminance signal and a pair of chrominance signals. The luminance signal conveys color brightness levels. The two chrominance signals convey the color hue and saturation. This color system is called YCC (or, more specifically, YCbCr).

In many applications, a number of useful compression models have been developed. One such model is referred to as Graphics Interchange Format, or GIF image. Technically, a GIF uses the 2D raster data type, is encoded in binary, and uses LZW compression. Currently, there are two versions of the format, 87*a* and 89*a*. Version 89*a* (July, 1989) allows for the possibility of an animated GIF, which is a short sequence of images within a single GIF file. A GIF89*a* can also be specified for interlaced presentation. Another commonly used color model is referred to as the JPEG standard was developed by a working group, known as the Joint Photographic Experts Group (JPEG). The JPEG image data compression standard handles grayscale and color images of varying resolution and size.

JPEG compression identifies and discards "extra" data that is beyond what the human eye can see. Since it discards data, the JPEG compression algorithm is considered "lossy." This means that once an image has been compressed and then decompressed, it will not be identical to the original image. In most cases, the difference between the original and compressed version of the image is indistinguishable. An advantage of JPEG compression is the ability to select the quality when compressing the image. The lower the quality, the smaller the image file size, but the more different it will appear than the original.

The JPEG File Interchange Format (JFIF) is a minimal file format that enables JPEG bitstreams to be exchanged between a wide variety of platforms and applications. This minimal format does not include any of the advanced features found in the TIFF JPEG specification or any application-specific file format. The sole purpose of this simplified format is to allow the exchange of JPEG compressed images.

The JFIF features are:

uses the JPEG baseline image compression algorithm;

uses JPEG interchange format compressed image representation; and compatible with most platforms (PC, Mac, or Unix).

Figure 4:
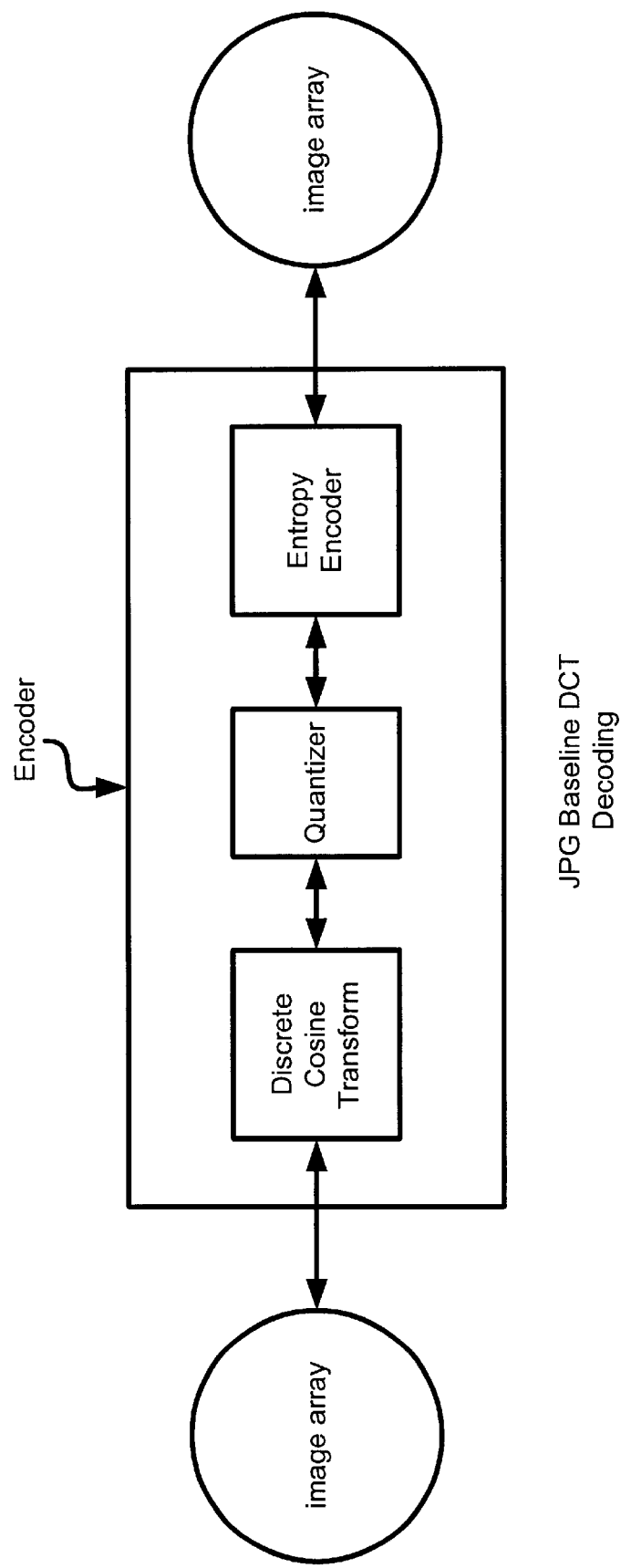
FIG. 4 illustrates an exemplary DCT JPEG encoder/decoder in accordance with an embodiment of the invention.

Discrete Cosine Transform, or DCT, encoding is illustrated in FIG. 4 showing a JPG DCT encoder 400. For encoding, an image array 402 is divided into 8×8 pixel blocks and a discrete cosine transform (DCT) 404 is taken of each block, resulting in an 8×8 array of transform coefficients. It should be noted that the DCT is a mathematical operation that takes the block of image samples as its input and converts the information from the spatial domain to the frequency domain. The 8×8 matrix input to the DCT represents brightness levels at specific x, y coordinates. The resulting 8×8 matrix values represent relative amounts of 64 spatial frequencies that make up the spectrum of the input data.

A quantizer 406 coupled to the DCT quantizes the transform coefficients by dividing each DCT coefficient by a value from a quantization table. The quantization operation discards the smaller-valued frequency components, leaving only the larger-valued components.

After an image array has been quantized, it enters an entropy encoder 408, which creates the actual JPEG bitstream 410 that forms the compressed image array 412. The entropy encoder 408 assigns a binary code to coefficient values. The length of each code is chosen to be inversely proportional to the expected probability of occurrence of a coefficient amplitude—frequently-occurring coefficient values get short code words, seldom-occurring coefficient values get long code words. The entropy encoder uses two tables, one for the AC frequency components and one for the DC frequency components.

The JPEG decoding process is essentially the inverse of the encoding process. The compressed image array data stream 410 passes through the entropy encoder 408, which recreates the quantized coefficient values. Then, the quantized coefficients are reconstructed by multiplication with the quantizer table values at 408. Finally, an inverse DCT is performed and the reconstructed image array is produced at 404.

Figure 5:
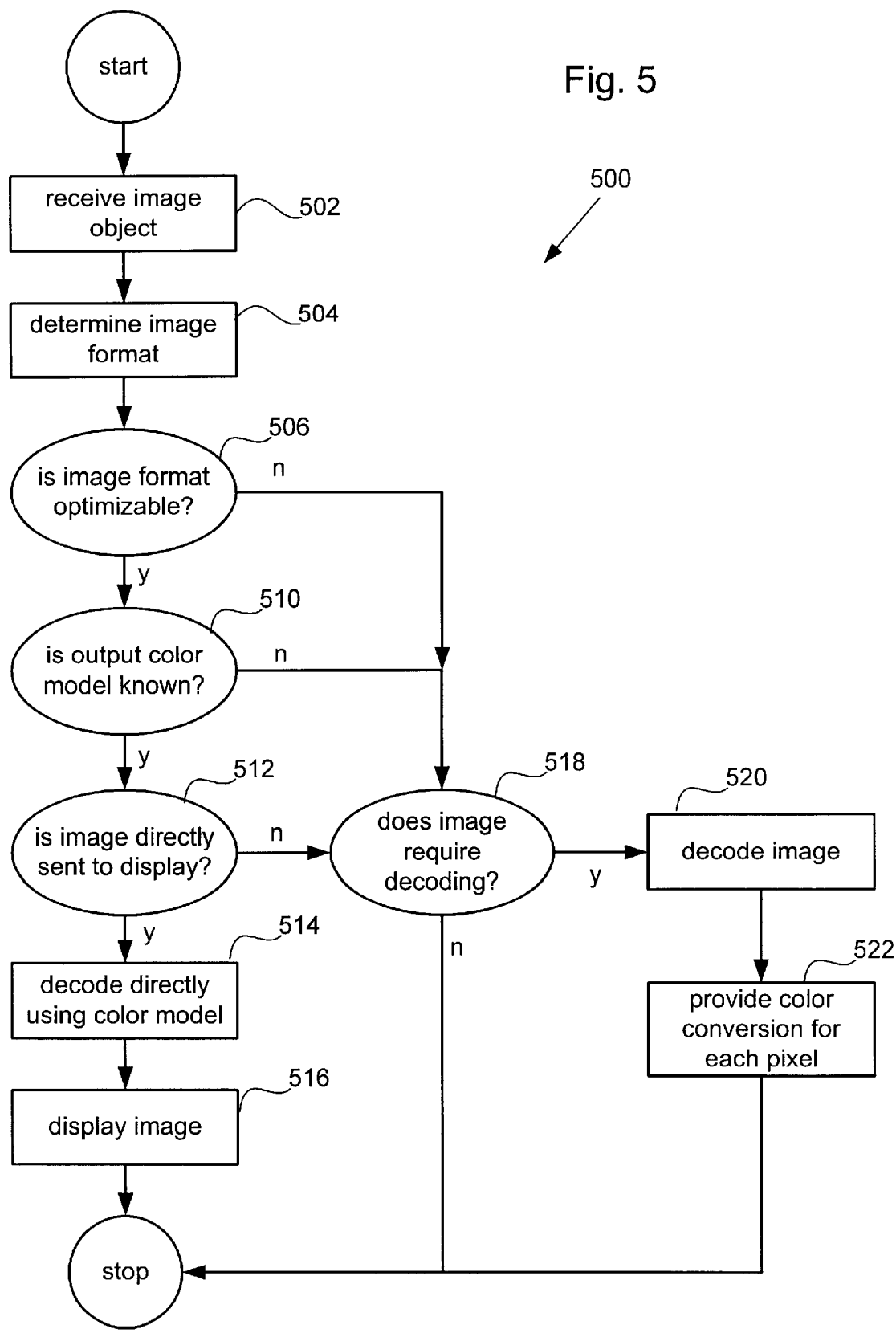
FIG. 5 is a flowchart detailing a process for displaying a digital image on a display monitor in accordance with an embodiment of the invention.

FIG. 5 is a flowchart detailing a process 500 for directly decoding an encoded image in accordance with an embodiment of the invention. The process 500 starts at 502 when an image object is received. At 504, the image format is determined after which a determination at 506 is made whether or not the image format is optimizable. Based upon whether or not the received image object can be directly decoded using any of the resident color models. Such a determination can be based, in part, upon the display characteristics of a monitor used to view the decoded image. If the output color model is determined at 510 and the image is to be sent directly to the display monitor at 512, then the image is decoded directly using an appropriate color model at 514. The decoded image is then sent to a display at 516 for viewing.

Returning to 506, 510, or 512, if the image format is not optimizable, or the output color model is not known, or the image is not sent directly to the monitor, then a determination is made at 518 whether or not the image requires decoding. If the image does not require decoding, then the image is sent directly to the display at 516 for viewing. On the other hand, if the image does require decoding, then the image is decoded into an intermediate color model on a pixel by pixel basis at 520 and color conversion to the display's color model is provided on a pixel by pixel basis at 522 after which the image is sent directly to the display 516 for viewing.

Figure 6:
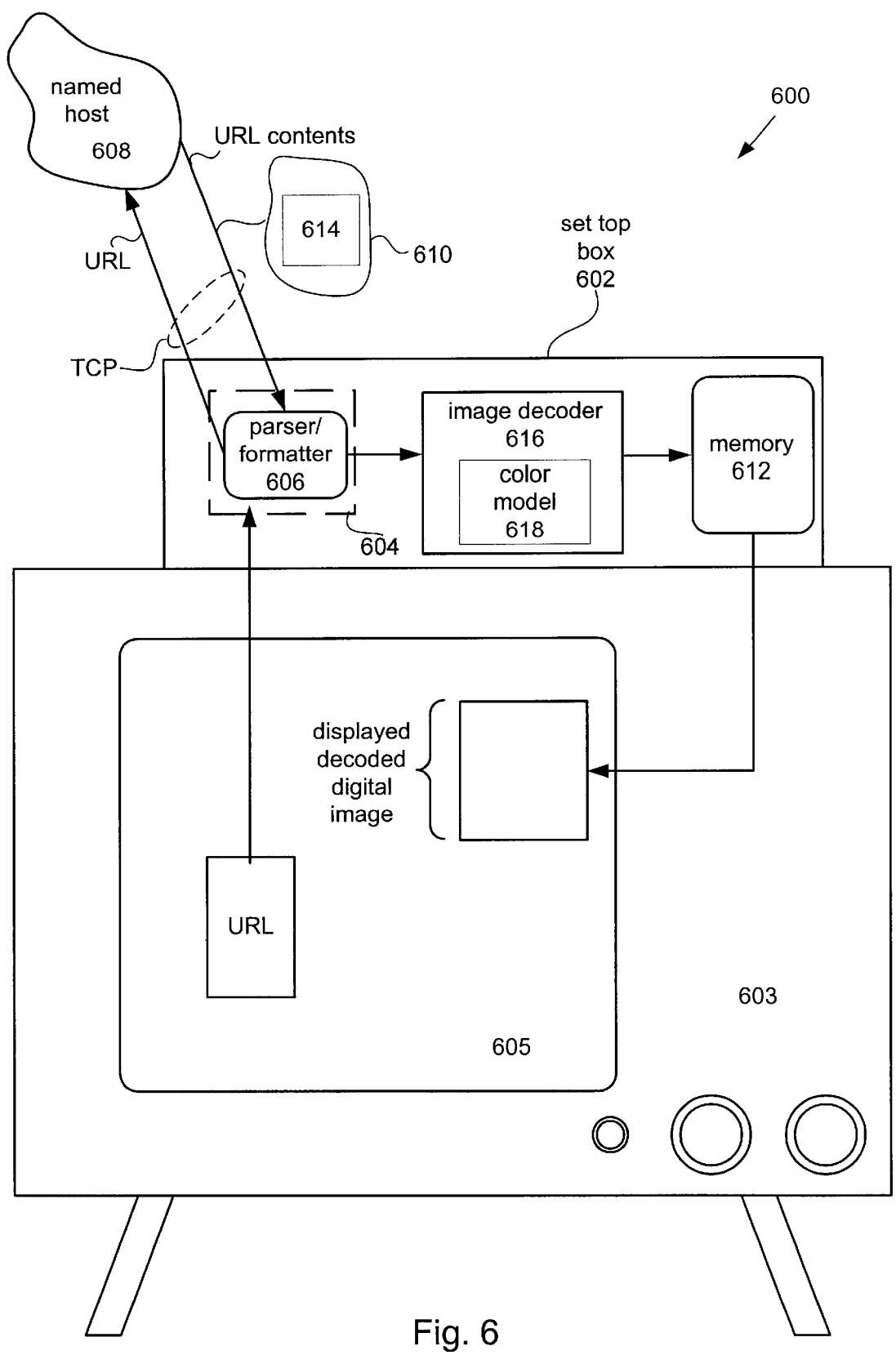
FIG. 6 is a set top box arrangement in accordance with an embodiment of the invention.

Most interactive systems utilize browsers incorporating a very simple approach to networking as illustrated in FIG. 6. An exemplary interactive system 600 includes a set top box 602 that hosts a browser 604 connected to a television 603 having a monitor 605. The browser 604 includes a parser/formatter 606 that breaks up (parses) a URL (universal resource locator) containing a host name and a document that includes various complex characters rendered as character bitmaps. The parser/formatter 606 breaks the URL into a named host 608 and a requested document 610. In one embodiment of the invention, the requested document 610 takes the form of HTML (Hyper Text Markup Language) statements well known to those skilled in the art.

In the case where the requested document is not stored in a local cache memory 612, the parser/formatter 606 makes a TCP ("transmission control protocol") connection to the named host 608 and retrieves the URL contents that includes the a digital image 614 associated with the requested URL document 610. The parser formatter 604 is in turn coupled to an image decoder 616 that is one embodiment of the image decoder 214. Since the encoded digital image 614 can be directly decoded to a digital image suitable for viewing on television monitor 605, the image decoder 606 directly decodes the encoded digital image 614 using a resident color model 608. It should be noted that since the television 603 can be a standard NTSC analog television capable of displaying 475 active line or the television 603 can be a high definition digital television capable of displaying 1150 lines, the decoder 606 must determine the display capability of the monitor 616.

Figure 7:
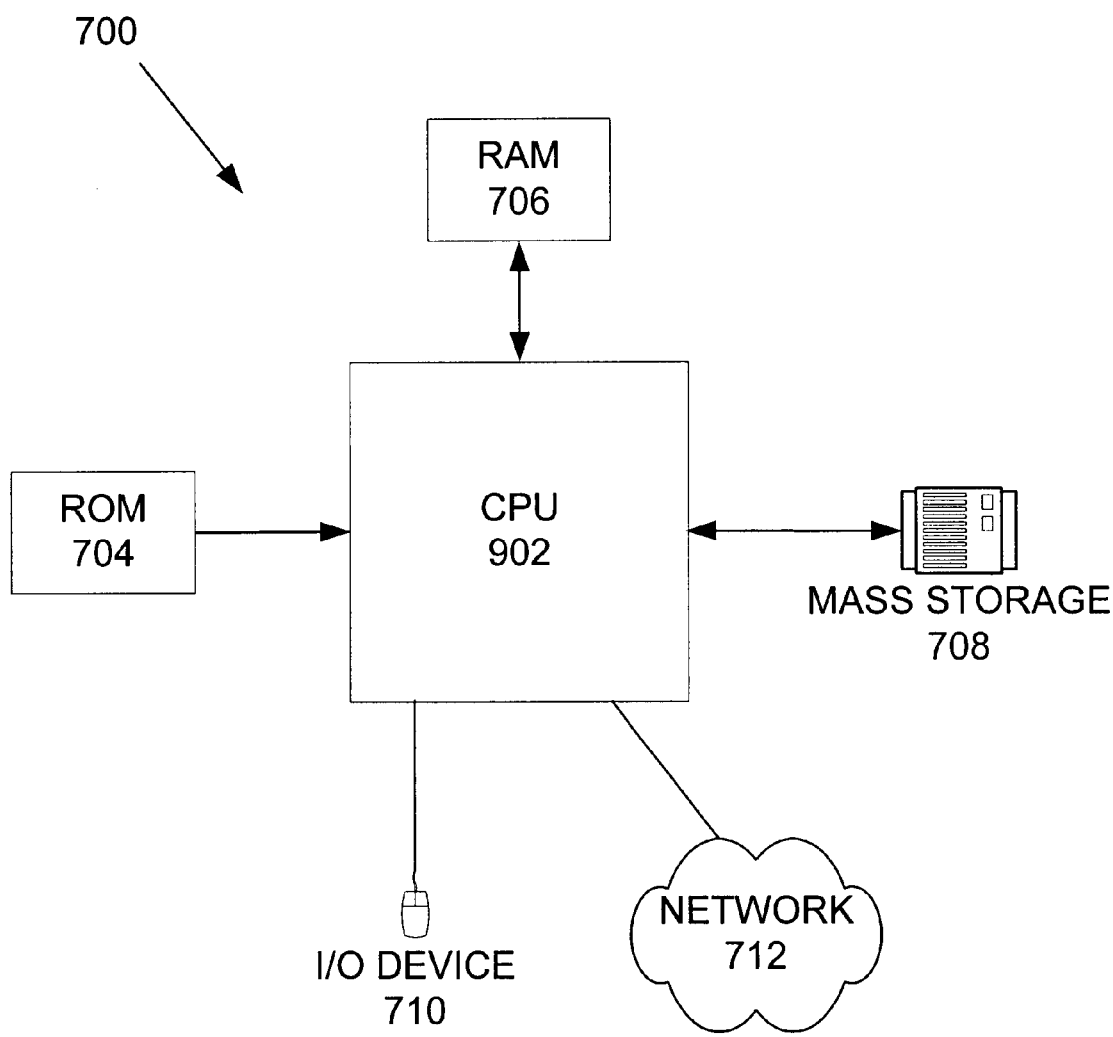
FIG. 7 shows an exemplary computer system useful in implementing the invention.

FIG. 7 illustrates a computer system 700 that can be employed to implement the present invention. The computer system 700 or, more specifically, CPUs 702, may be arranged to support a virtual machine, as will be appreciated by those skilled in the art. As is well known in the art, ROM acts to transfer data and instructions uni-directionally to the CPUs 702, while RAM is used typically to transfer data and instructions in a bidirectional manner. CPUs 702 may generally include any number of processors. Both primary storage devices 704, 706 may include any suitable computer-readable media. A secondary storage medium 708, which is typically a mass memory device, is also coupled bi-directionally to CPUs 702 and provides additional data storage capacity. The mass memory device 708 is a computer-readable medium that may be used to store programs including computer code, data, and the like. Typically, mass memory device 708 is a storage medium such as a hard disk or a tape which generally slower than primary storage devices 704, 706. Mass memory storage device 708 may take the form of a magnetic or paper tape reader or some other well-known device. It will be appreciated that the information retained within the mass memory device 708, may, in appropriate cases, be incorporated in standard fashion as part of RAM 706 as virtual memory. A specific primary storage device 704 such as a CD-ROM may also pass data uni-directionally to the CPUs 702.

CPUs 702 are also coupled to one or more input/output devices 710 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 702 optionally may be coupled to a computer or telecommunications network, e.g., an Internet network or an intranet network, using a network connection as shown generally at 712. With such a network connection, it is contemplated that the CPUs 702 might receive information from the network, or might output information to the network in the course of performing the above-described method steps. Such information, which is often represented as a sequence of instructions to be executed using CPUs 702, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, any form of digitized information storable in a memory can be used, such as images, text files, etc.

Although the methods of intelligently decoding an encoded digital image in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated web browser, it should be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. In an object based computer system, a computer implemented method for displaying a digital image on a display monitor coupled to the computer system, comprising:

receiving a digital image;

determining a format of the received digital image;

determining an output color model associated with the received digital image;

directly decoding the received image object using the output color model;

sending the decoded image to the monitor; and displaying the decoded image on the monitor.

2. A method as recited in claim 1 further comprising if it is determined that the format of the received digital image is not directly decodable, or if it is determined that the output color model is not known, or if it is determined that the image is not sent directly to the monitor, then determining if the image requires decoding.

3. A method as recited in claim 2, further comprising if it is determined that the image does not require decoding, then sending the image directly to the monitor.

4. A method as recited in claim 2, further comprising if it is determined that if the image does require decoding then decoding the image;

providing a pixel by pixel color conversion of the image; and sending the decoded image directly to the monitor.

5. A method as recited in claim 1, wherein the image format is selected from the group comprising: JPG, GIF, RGB, color index, and YCbCr.

6. An apparatus as recited in claim 5, wherein the monitor is coupled to a system for receiving television signals.

7. A method as recited in claim 6, wherein the system is coupled to a set top box arranged to retrieve a requested document from a host computer, wherein the requested document includes a digital image.

8. A method as recited in claim 7, wherein the set top box includes an image decoder arranged to receive the digital image and decode the digital image based upon the display capability of the monitor.

9. A method as recited in claim 8, wherein the set top box includes a memory coupled to the monitor and coupled to the image decoder suitable for storing the decoded digital image.

10. An apparatus for displaying a digital image on a display monitor, comprising:

means for receiving a digital image;

means for determining a format of the received digital image;

means for determining an output color model associated with the received digital image;

means for directly decoding the received image object using the output color model;

means for sending the decoded image to the monitor; and means for displaying the decoded image on the monitor.

11. An apparatus as recited in claim 10, wherein the monitor is coupled to a system suitable for receiving television signals.

12. An apparatus as recited in claim 11, wherein the television system is coupled to a set top box arranged to retrieve a requested document from a host computer, wherein the requested document includes a digital image.

13. An apparatus as recited in claim 12, wherein the set top box includes an image decoder arranged to receive the digital image and decode the digital image based upon the display capability of the monitor.

14. An apparatus as recited in claim 13, wherein the set top box includes a memory coupled to the monitor and coupled to the image decoder suitable for storing the decoded digital image.

* * * * *